Nov. 23, 1965 C. F. CAFOLLA 3,218,890
INDEX STOP AND LOCK MECHANISM
Filed June 7, 1963 2 Sheets-Sheet 1
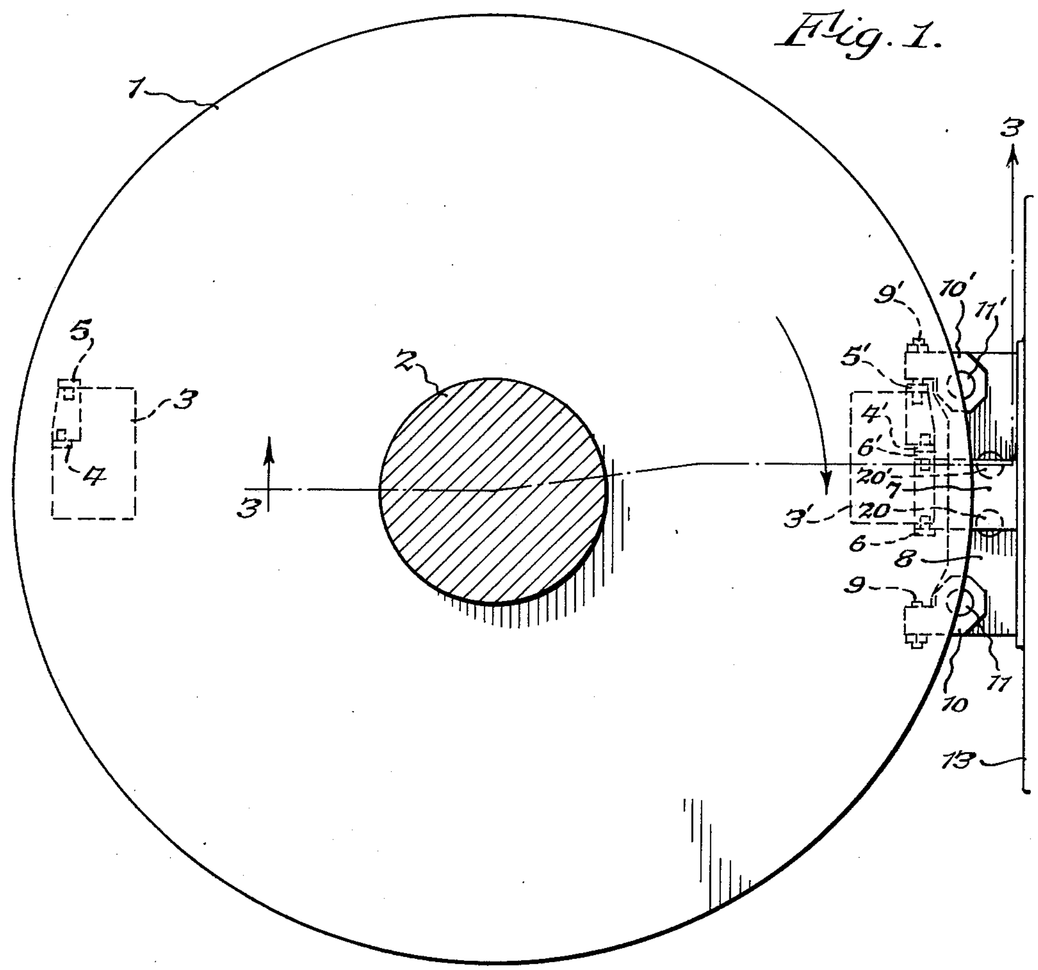
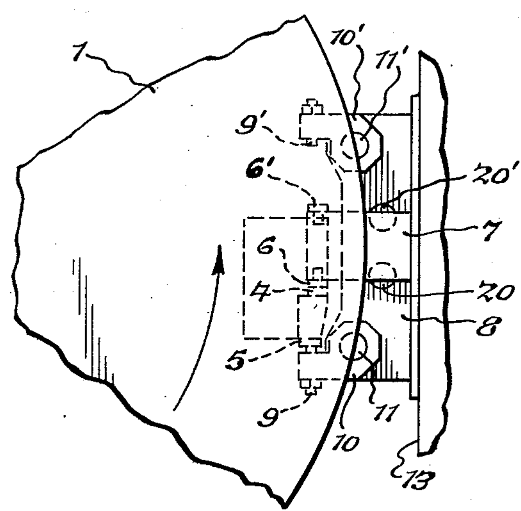
INVENTOR.
Constantine F. Cafolla
BY
Christel & Bean
ATTORNEYS.

INDEX STOP AND LOCK MECHANISM

Filed June 7, 1963

INVENTOR.
Constantine F. Cafolla
BY
Christel & Bean
ATTORNEYS.

United States Patent Office 3,218,890

Patented Nov. 23, 1965

3,218,890

INDEX STOP AND LOCK MECHANISM

Constantine F. Cafolla, Waterloo, N.Y., assignor to Seneca Falls Machine Company, Seneca Falls, N.Y.

Filed June 7, 1963, Ser. No. 286,900

9 Claims. (Cl. 74—815)

This invention relates to a new and useful index stop and lock mechanism.

The primary object of this invention is to provide a stop and lock mechanism accurately locating two positions of index and locking an index table in either of those positions, with a single mechanism.

Another object of this invention is to provide the foregoing in a mechanism wherein the locking forces are self-contained, and not reflected on any other portion of the surrounding machine.

In one aspect thereof, an index stop and lock mechanism constructed in accordance with my invention is characterized by the provision of an index table mounted for rotation alternately in opposite directions, a fixed stop, a pair of movable stops carried by the table for rotation therewith, one of the movable stops engaging the fixed stop upon rotation of the table in one direction, thereby defining one indexed position of the table, the other of the movable stops engaging the fixed stop upon rotation of the table in the opposite direction, thereby defining another indexed position of the table, a pair of locking members mounted for movement into and out of locking position relative to the fixed stop, one of the locking members holding the one movable stop in engagement with the fixed stop to lock the table in the one position, the other locking member holding the other movable stop against the fixed stop to lock the table in the other position, and means for so moving the locking members.

The foregoing and other objects, advantages and characterizing features of my invention will become clearly apparent from the ensuing detailed description of an illustrative embodiment thereof, considered in conjunction with the accompanying drawings depicting the same, wherein like reference numerals denote like parts throughout the various views and wherein:

FIG. 1 is a top plan view of the index table locked in one indexed position by a stop and lock mechanism of my invention;

FIG. 2 is a fragmentary top plan view of the index table in its other indexed position;

Figures 3, 4, 5, 6, 7:
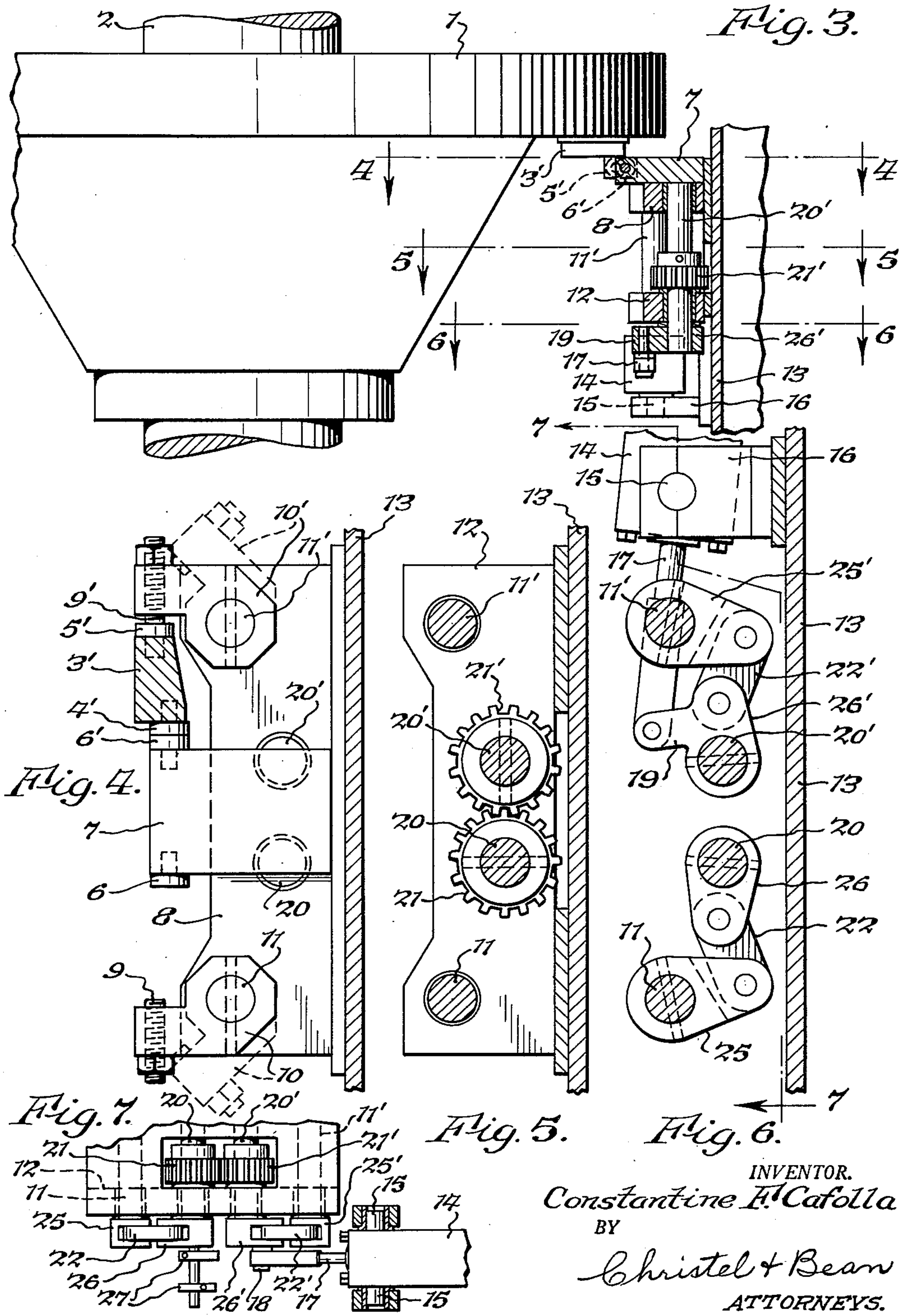
FIG. 3 is a fragmentary vertical sectional view thereof, taken about on line 3—3 of FIG. 1.
FIG. 4 is a top plan view, on an enlarged scale, of the stop and lock mechanism of my invention, being taken about on line 4—4 of FIG. 3.
FIG. 5 is a horizontal sectional view thereof, taken about on line 5—5 of FIG. 3.
FIG. 6 is a horizontal sectional view thereof, taken about on line 6—6 of FIG. 3, with part of the actuating motor being shown and with other parts omitted for clarity.
FIG. 7 is a vertical sectional view thereof taken about on line 7—7 of FIG. 6.

Referring now in detail to the illustrative embodiment depicted in the accompanying drawings, there is shown an index table 1 carried by a center column 2 for rotary reciprocation about the axis thereof. An indexing mechanism, not shown, will be provided for reciprocating column 2 and table 1, such mechanism being of any suitable type, a preferred type being that described in my copending application being filed simultaneously herewith, Serial No. 286,428, filed June 7, 1963, entitled Index Mechanism.

A pair of movable stops 3, 3′ are carried by index table 1 for rotation therewith. Each movable stop comprises a plate secured to the underside of table 1 and mounting a pair of oppositely facing stop pins 4, 5 and 4′, 5′, respectively. A fixed stop 7 is provided, comprising a pair of oppositely facing stop pins 6, 6′ carried by a plate fixed to the top plate 8 of a lock mechanism to be described.

In the position shown in FIG. 1, index table 1 has been rotated in the direction of the arrow until pin 4′ abuts pin 6′. In the other, 180° index position shown in FIG. 2, table 1 has been rotated in the direction of the arrow until pin 4 abuts pin 6. Movable stops 3, 3′ and fixed stop 7 thereby locate and define two, positions of index of table 1. Pins 4, 4′, 5, 5′ and 6, 6′, or any of them, can be adjustable, if desired.

To prevent movement of index table 1 out of position when work is being performed, I provide for locking index table 1 in either position, as follows.

A pair of adjustable lock pins 9, 9′ are carried by locking arms 10 and 10′, respectively, for movement into and out of locking positions wherein pins 9 and 9′ engage pins 5 and 5′, respectively. Arms 10 and 10′ are fixed to shafts 11 and 11′, respectively, for rotation therewith, the shafts being journaled at their lower ends in a bottom plate 12, which, like top plate 8, is secured to the machine frame 13.

Arms 10 and 10′, are swung in unison, into and out of locking position. This action is provided by a single actuator, which can be of any suitable type. In the illustrated embodiment it comprises a piston type air or hydraulic motor 14, pivotally supported at 15 on a bracket 16 secured to frame 13. Piston rod 17 extends from motor 14. A pin 18 pivotally connects the outer end of rod 17 to a crank arm 19 extending from an arm 26′ mounted on the lower end of a shaft 20′ for rotation therewith. Shaft 20′ is journaled in base plate 12, and carries a gear 21′ meshing with a like gear 21 on a corresponding shaft 20 also journaled in base plate 12.

A connecting link 22′ has one end pivoted in a clevis portion of arm 26′. The other end of link 22′ is pivotally connected in a clevis portion of an arm 25′ mounted on shaft 11′ for rotation therewith. A connecting link 22 is pivotally connected at one end in a clevis portion of an arm 26 mounted on shaft 20 for rotation therewith. At its other end, link 22 is pivotally connected in a clevis portion of an arm 25 mounted on shaft 11 for rotation therewith.

Thus, locking arms 10, 10′ are mounted for simultaneous, equal but opposite movement between their locking position, shown in full lines in FIG. 4, and their unlocked position shown in broken lines therein.

In operation, when motor 14 retracts piston rod 17, crank arm 19 is rotated in a direction rotating arms 10 and 10′ into their locking position, clamping against the fixed stop whichever movable stop is associated with that position of the table. Extension of piston rod 17 by motor 14, simultaneously swings arms 10 and 10′ to open or unlocked position enabling movement of the one table stop away from the fixed stop and movement of the other table stop into engagement with the fixed stop. Shaft 20 has an extension, carrying switch actuating control dogs 27 for indicating the position of the locking mechanism.

Accordingly, it is seen that my invention fully accomplishes its intended objects. There is provided a single stop and lock mechanism, accurately locating two index positions of the table and locking the table in either position. The paired clamping members require but a single actuator, and the mechanism is so constructed that locking forces are self-contained, within the lock mechanism, and not reflected on other portions of the machine.

While I have described in detail only one embodiment of my invention, that has been done by way of illustration, it being my intention that the scope of my invention be defined by the appended claims.

Having fully disclosed and completely described my invention, what I claim as new is:

1. An index stop and lock mechanism comprising, an index table mounted for rotation in opposite directions, a fixed stop, a pair of movable stops carried by said table for rotation therewith, one of said movable stops engaging said fixed stop upon rotation of said table in one direction, thereby defining one indexed position of said table, the other of said movable stops engaging said fixed stop upon rotation of said table in the opposite direction, thereby defining another indexed position of said table, a pair of locking members mounted for movement into and out of locking position relative to said fixed stop, one of said locking members holding said one movable stop in engagement with said fixed stop to lock said table in said one position, the other of said locking members holding said other movable stop in engagement with said fixed stop to lock said table in said other position, and means for so moving said locking members.

2. An index stop and lock mechanism as set forth in claim 1, together with a single actuator, and means connecting said actuator to said locking members for moving the same in unison into and out of said locking position.

3. An index stop and lock mechanism as set forth in claim 1, wherein said locking members comprise arms, a pair of first shafts mounting said locking arms for swinging movement into and out of locking position, a pair of second shafts, intermeshing gears connected to said second shafts for equal and opposite rotation thereof, a connecting arm carried by each of said first and second shafts for rotation therewith, connecting links between the connecting arms of corresponding ones of said first and second shafts, and reciprocating drive means connected to one of said second shafts for simultaneous movement of said locking arms into and out of locking position.

4. An index stop and lock mechanism comprising, an index table mounted for rotation in opposite directions, a fixed stop, a pair of movable stops carried by said table for rotation therewith, one of said movable stops engaging said fixed stop on one side thereof upon rotation of said table in one direction, thereby defining one indexed position of said table, the other of said movable stops engaging said fixed stop on the other side thereof upon rotation of said table in the opposite direction, thereby defining another indexed position of said table, a pair of locking members mounted for movement into and out of locking position relative to said fixed stop on opposite sides thereof, one of said locking members holding said one movable stop in engagement with said fixed stop to lock said table in said one position, the other of said locking members holding said other movable stop in engagement with said fixed stop to lock said table in said other position, and means for so moving said locking members.

5. An index stop and lock mechanism comprising, an index table, opposed pairs of oppositely facing stops carried by said index table, a pair of oppositely facing fixed stops, said table being rotatable in one direction to one position engaging one movable stop of one pair thereof against one of said fixed stops, said table also being rotatable in the opposite direction to another position engaging one movable stop of the other pair thereof against the other fixed stop, thereby locating two reciprocating indexed positions of said table, a pair of lock arms, means mounting said arms for movement in unison into and out of a locking position in which one of said arms engages the other movable stop of said one pair thereof and holds the companion one of said movable stops against said one fixed stop when said table is in said one position, thereby locking said table in said one indexed position, the other of said arms similarly engaging the other movable stop of said other pair thereof to hold the companion one of said movable stops against said other fixed stop when said table is in said other position, thereby locking said table in said other indexed position, and means for so moving said arms.

6. An index stop and lock mechanism comprising, an index table, a pair of stop plates carried by said index table, a pair of oppositely facing stop pins carried by each of said movable stop plates, a fixed stop plate, a pair of oppositely facing stop pins carried by said fixed stop plate, said table being rotatable in one direction to one position engaging one movable stop pin of one pair thereof against one of said fixed stop pins, said table also being rotatable in the opposite direction to another position engaging one movable stop pin of the other pair thereof against the other fixed stop pin, thereby locating two reciprocating indexed positions of said table, a pair of arms, a lock pin carried by each of said arms, means mounting said arms for movement in unison into and out of a locking position in which one of said lock pins engages the other movable stop pin of said one pair thereof and holds the companion one of said movable stop pins against said one fixed stop pin when said table is in said one position, thereby locking said table in said one indexed position, the other of said lock pins similarly engaging the other movable stop pin of said other pair thereof to hold the companion one of said movable stop pins against said other fixed stop pin when said table is in said other position, thereby locking said table in said other indexed position, said lock pins being adjustable, and means for so moving said arms.

7. An index stop and lock mechanism as set forth in claim 6, wherein said last-named means include a single actuator connected to both of said arms for so moving the same.

8. An index stop and lock mechanism as set forth in claim 6, a pair of first shafts mounting said locking arms for swinging movement into and out of locking position, a pair of second shafts, intermeshing gears connected to said second shafts for equal and opposite rotation thereof, a connecting arm carried by each of said first and second shafts for rotation therewith, connecting links between the connecting arms of corresponding ones of said first and second shafts, and reciprocating drive means connected to one of said second shafts for simultaneous movement of said locking arms into and out of locking position.

9. An index stop and lock mechanism as set forth in claim 8, together with position sensing switch actuator means connected to one of said shafts for movement therewith.

No references cited.

BROUGHTON G. DURHAM, *Primary Examiner.*